United States Patent [19]

Markow et al.

[11] 4,456,048
[45] Jun. 26, 1984

[54] DUAL-MODULUS BAND BANDED TIRE

[75] Inventors: Edward G. Markow, Oakdale; Michael A. Kopsco, Wantagh, both of N.Y.

[73] Assignee: Grumman Aerospace Corporation, Bethpage, N.Y.

[21] Appl. No.: 460,492

[22] Filed: Jan. 24, 1983

[51] Int. Cl.³ .............................................. B60C 17/00
[52] U.S. Cl. ....................... 152/330 RF; 152/361 DM
[58] Field of Search ............... 152/197, 198, 200, 207, 152/330 RF, 356 R, 361 R, 361 FP, 361 DM, DIG. 19, 156, 158

[56] References Cited

U.S. PATENT DOCUMENTS

| | | | |
|---|---|---|---|
| 3,342,239 | 9/1967 | Olagnier | 152/361 R |
| 3,667,529 | 6/1972 | Mirtain | 152/361 DM |
| 3,734,157 | 5/1973 | Roque | 152/158 |
| 4,111,249 | 9/1978 | Markow | 152/361 R |

FOREIGN PATENT DOCUMENTS

| | | | |
|---|---|---|---|
| 11179 | 12/1909 | France | 152/356 |
| 1205722 | 2/1960 | France | 152/361 R |
| 1433298 | 5/1965 | France | 152/361 R |
| 2248161 | 6/1975 | France | 152/361 DM |
| 1035341 | 7/1966 | United Kingdom | 152/156 |

Primary Examiner—Edward C. Kimlin
Assistant Examiner—F. K. Wine
Attorney, Agent, or Firm—Richard G. Geib

[57] ABSTRACT

A banded radial run-flat tire having a band with a dual-modulus of bending deflection behavior. Bands producing various basic dual-modulus characteristics are disclosed. In one type, the band has a greater resistance to bending forces tending to decrease its local radius of curvature than to those tending to flatten it. In a second type, bending stiffness increases with increasing stress irrespective of the bending direction. In a third type, a two-step modulus is demonstrated in which deflection is initially resisted at one rate and final deflection is resisted at a higher rate. Various embodiments of the band are disclosed in which the various types of dual-modulus behavior are obtained either by mechanical structural means or by internal geometry means.

18 Claims, 25 Drawing Figures

DUAL-MODULUS BAND BANDED TIRE

BACKGROUND OF THE INVENTION

1. Field Of The Invention

This invention relates to banded radial run-flat tires and, more particularly, to banded tires having a dual-modulus of stiffness band for enhancing the performance of the tire in the deflated or partially inflated condition.

2. Background Of The Invention

An area of tire technology which has engaged investigators over the years is the run-flat pneumatic tire concept. A run-flat tire is one designed to support a vehicle for operation even if the tire has partially or totally lost its inflation pressure. The advantages of such a tire in safety, convenience, and cost are obvious. In addition, the elimination of the requirement for a spare wheel and tire results in a weight and space savings for the vehicle itself that achieves a long-sought goal in the industry. A recent successful development in the art of run-flat tires is the band-reinforced radial tire invented by one of the inventors in the present application, which banded tire is the subject of U.S. Pat. No. 4,111,249, assigned to the assignee of the present invention. The types of run-flat tires with which the dual modulus band of the subject invention can be used are disclosed in that Markow patent, U.S. Pat. No. 4,111,249, which is hereby incorporated herein by reference.

The banded run-flat tire is a pneumatic radial tire having a casing with a crown and sidewalls. The sidewalls extend radially inward from the crown on either side to annular beads which, in a conventional way, are used to mount the tire in a sealed relationship on the rim of a wheel. In the design, the band element is incorporated circumferentially in the crown region of the tire radially inwardly from the tread thereof. Any suitable high-strength material can be used for the band, preferably the band is a thin structural ring fabricated from a fiber/epoxy composite. Radial tires, as is well known, have a multiplicity of closely spaced radial reinforcing cords or wires in the sidewalls. In run-flat tires such as those disclosed in the above-referenced patent to Markow, the radial cords or wires function as spoke-like reinforcing elements to stabilize the circumferentially extending band. When the tire is deflated, the radial spoke-like elements and the band stabilized thereby form a load-sustaining structure analogous to an elastic arch. In banded tire designs, the band receives vertical, drag, and side loads from the road or ground surface. These loads are carried in compression and bending, with the spoke-like radial elements acting as tension members to support the axle. A further important function of the closely spaced radial elements is to stabilize the band against buckling.

In the interests of maximum efficiency, when operating with the tire normally inflated, the band should not interact adversely with the tire. A tire and its band in operation maintain a substantially cylindrical shape except for a flattening at the footprint or the sector of the tire in contact with the surface. In the inflated condition, the tire has a relatively small footprint where the tire and the band flattens in contact with the surface and there is a gradual bend in the transition zone at the leading and trailing edges of the footprint between the flattened portion and the normally cylindrical portion of the tire. It will be seen that a particular segment of the band (and tire) will be subject, therefore, to a cycle of bending twice during each revolution of the tire as that segment passes through the transition zones on either side of the footprint. It is also in the footprint area that most of the unpredictable transient loads caused by road surface anomalies occur.

In normal inflated operation, because the band undergoes only limited bending in the transition zone between the normally cylindrical portion and the relatively limited flattened portion, only limited tensile stresses are induced in inner surface (ID) of the band. These stresses thus are primarily in one direction only and are induced once during every revolution of the tire. Under these conditions, the band is designed to withstand about 50-million cycles of bending. Run-flat operation, in addition to ground contact stresses, induces significant bending stresses in the opposite direction as well, in that the band undergoes stresses in compression as well as in tension. Thus, in the deflated condition, fully reversed bending stresses occur twice during each tire revolution as any given band segment passes through the forward and aft transition zones of severe curvature. Here design life is in the order of about 175-thousand cycles.

In an optimum design for the band in a banded tire, stresses are kept within a calculated allowable stress to achieve an acceptable fatigue life for both normal and run-flat operation. A sufficient fatigue margin to accommodate high transient ground contact loads, which might be applied at the band edges, has to be incorporated into the design. In addition, the band has to be sufficiently stiff for it to assume its proper proportion of structural support when the tire is running deflated. It has been found that such an optimum design is difficult to achieve at reasonable cost with a single modulus of stiffness band material.

3. Description Of The Prior Art

The present invention relates to a banded radial run-flat tire having a dual-modulus of stiffness band. In the prior art, banded radial run-flat tires are disclosed in the Markow patent, U.S. Pat. No. 4,111,249, referenced previously herein. Unlike the dual-modulus bands in the present invention, the bands disclosed in that Markow patent have a constant modulus providing a classic linear load/deflection relationship when the band bends in operation.

In embodiments of the present invention, the bands preferably are fabricated from fiber/resin composites which are laid up or fabricated using filament winding techniques. A dual modulus behavior is achieved in the bands in several of those embodiments by the use of techniques involving the increasing of filament tension in the later stages of the winding process. Pre-stressing filament wound structural elements such as pressure vessels and pipes by the use of means such as expandible mandrels is well known in the prior art. However, the prior art teachings of pre-stressing techniques are directed to static structures rather than to the attainment of a dual-modulus bending behavior in a dynamic flexible annular band structure which undergoes large cyclic bending deflections as an inherent aspect of its operation.

Pre-stressing techniques for the cords or plies of tires are also known in the prior art. The techniques include the use of greater tension or extensibility of various cords or plies with respect to other cords or plies in the carcass or breaker strips or belts of conventional unbanded tires. Representative examples of such teachings are disclosed in French patent of addition No. 11,179 (1910), British No. 758,914, and U.S. Pat. Nos. 2,198,586, and 2,990,870. It will be seen that these prior art patents are addressed to details of carcass ply configurations which are intended to equalize the stress distribution in operation in loaded, inflated tires. There is nothing in these prior art tire disclosures that teaches the attainment in banded radial run-flat tires of a band having a dual-modulus of bending such that the performance in the uninflated condition of those tires is significantly improved thereby.

SUMMARY OF THE INVENTION

This invention is a banded radial run-flat tire, the band of which has a dual-modulus of bending deflection. Bands having three types of dual-modulus bending characteristics are disclosed. In the first type of dual-modulus band, the band is designed so that it has a greater resistance to bending forces tending to decrease its local radius of curvature than to those tending to flatten it. In the second type, bending stiffness increases with increasing stress irrespective of the bending direction. In the third type, the design produces a two-step modulus in which initial deflection is resisted at one rate and final deflection at another rate.

Various embodiments of bands having the first type of dual-modulus behavior in which the modulus differs in accordance with the direction of bending are disclosed. In a first embodiment, the band is constructed with a radially outward substantially solid circumferential section and a radially inward circumferential section provided with discontinuities such as transverse slits around its inside periphery. The discontinuities allow the band to resist compression such as would be involved in forces tending to reduce the radius of the band, but not to tension acting to flatten a sector of the band. A second embodiment for achieving a favorable variation in stiffness with bending direction has a thin band to which are attached standoff shear ties around the outer diameter. These shear ties are connected to one another by thin fibers in an arrangement in which the fibers resist tensile loads on the band but which buckle when reverse bending puts them in compression. A third embodiment exhibiting variation in stiffness with bending direction has a thin band on the outside periphery of which are attached transversely corrugated strips. Attached to each trough of the corrugated strips is a radial strut. With this arrangement, compression loads tending to decrease the radius of the band are resisted by the struts, but tensile loads tending to flatten the band are not resisted. A fourth embodiment having this first type of dual-modulus exploits a band having an anticlastic shape. Typically, the band has an arcuate cross-section with an outwardly concave configuration. Under load, the arcuate cross-section will deform so as to have a lower section modulus where the band flattens out and a more stable section modulus due to elastic bulking where the band radius of curvature is decreasing. A further embodiment has a thin flat band having a plurality of coaxial rings of anticlastic configuration fastened side-by-side on the outside periphery of the band. In operation, each of the anticlastic rings will behave in the manner described for the previous embodiment. In a sixth embodiment for achieving a favorable variation in stiffness with bending direction, the band is fabricated out of various composite materials whose elastic properties are different in tension and in compression, the materials being arranged selectively in coaxial thicknesses. Thus, a thickness of material whose modulus is relatively lower in compression would be placed toward the outside diameter of the band.

Various embodiments of bands having the second type of dual-modulus behavior in which bending stiffness is increased with increasing stress are disclosed. One embodiment of this type of dual-modulus band has an elastomeric filler material sandwiched between coaxial inner and outer annular band elements, forming a structure analogous to a beam with the elastomeric material acting as the web of the beam and the annular elements the caps of the beam. In this embodiment, the caps are connected with discrete tensile fibers which are embedded in the elastomeric filler, which is of a type designed to work best in compression. When bending loads in either direction are applied to the structure, the fibers go into diagonal tension, putting the filler into compression. As the diagonal tension angle increases with load, the band stiffness increases proportionately. A further embodiment of this type of dual-modulus structure has a thin annular band to which are attached standoff shear ties around the inner and outer diameter. These shear ties are connected to one another by thin curved fibers in an arrangement in which the curved fibers on the side opposite the direction of bending straighten under load such that the band stiffens with increased stress and deflection.

In a preferred embodiment of the invention, a dual-modulus behavior of the band of the run-flat tire is obtained with a filament-wound band in which the outer filaments are pre-stressed. With a filament-wound band, by proper design, including a judicious choice of materials of construction, and control of the manufacturing process, any one of the three types of dual-modulus bending characteristics can be achieved by the use of a pre-stressing technique. In the technique, during filament winding around a cylindrical mandrel, the initial layers are laid down with low filament tension. In subsequent layers, filament winding tension is increased either in one large step or in a programmed series of smaller steps. The tension in these outer layers induces compression in the form of micro-wrinkles in the inner layers of the wound structure; all of these stresses are locked in during resin cure. When built into a tire, a band fabricated with a pre-stress technique has a relatively low bending modulus in a direction flattening out the band until the inner surface micro-wrinkles straighten, whereupon the band stiffens to resist overbending. Such overbending can be caused by impacting a pothole or a small obstacle. When bending in an opposite direction, the pre-stresses add to the induced stresses, causing the band to become stiff relatively early in its bending response.

With a bending direction-dependent dual-modulus band of the invention, the band can be stiff enough for proper run-flat tire operation and yet lower repeated stresses in the ground contact area are developed. Where band bending modulus is directly, but not necessarily linearly, proportional to applied load, the band can be made thinner and lighter. It will still provide proper support when running flat but will have relatively little influence on pressurized operation.

It is thus a principal object of the invention to provide a banded run-flat radial tire having a dual-modulus of bending band which has a low bending modulus at low stress levels and a distinctly higher modulus at stress levels above approximately 50% of failure stress.

It is a further object of the invention to provide a banded run-flat tire having a very supple band for low deflection pressurized operation and significantly increased stiffness as deflection is increased as in run-flat or unpressurized operation.

Another object of the invention is to provide a band for a banded run-flat tire in which the bending stiffness of the band in a direction tending to flatten the tire has a constant or multi-step increase with deflection and in which the bending stiffness in the opposite direction remains constant with deflection.

A yet further object of the invention is to provide a banded run-flat tire at reasonable cost in which tire the band stresses are within the fatigue limits for both pressurized and unpressurized operation with sufficient margin to accommodate high transient ground impact loads and yet in which the band stiffness is sufficient to accept a proper proportion of structural support during run-flat operation.

Other objects and advantages will become apparent from a reading of the Specification and a study of the accompanying drawings.

DESCRIPTION OF THE DRAWINGS

For the purpose of illustrating the invention, there is shown in the drawings the forms which are presently preferred; however, it should be understood that the invention is not necessarily limited to the precise arrangements and instrumentalities here shown.

DESCRIPTION OF THE PREFERRED EMBODIMENT

Figures 1, 2, 3:
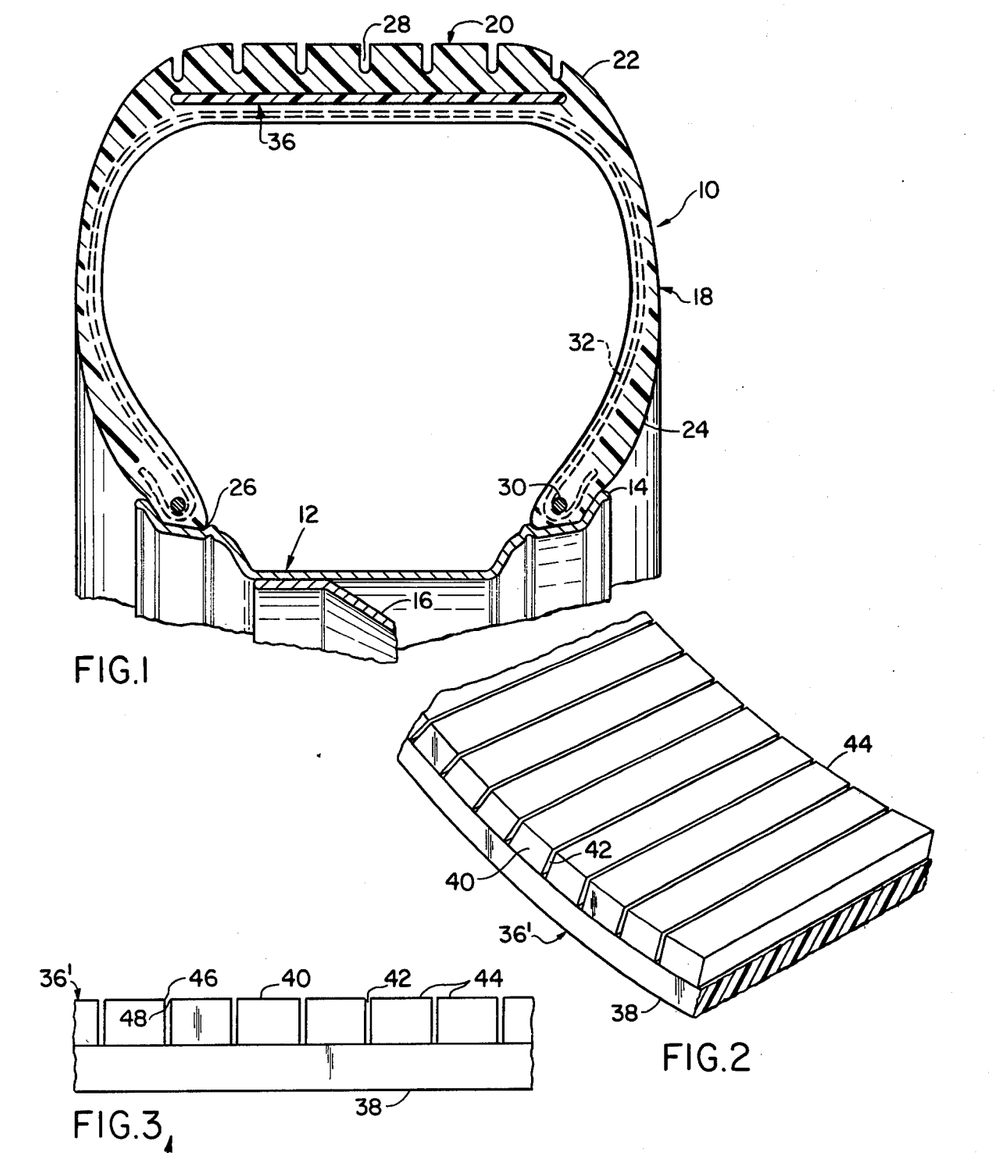
FIG. 1 is a cross-sectional view of an embodiment of a tire of the invention which also shows in fragmentary section a wheel with which the tire is adapted to be used.
FIG. 2 is a fragmentary view in perspective of an embodiment of the dual-modulus band of the invention.
FIGS. 3 and 4 are fragmentary side elevations of the band of FIG. 2 under various operating conditions.

Having now more particular reference to the drawings, FIG. 1 illustrates an embodiment of a tire 10 of the invention mounted on a wheel 12 which may be of a conventional type having a drop-center rim 14 welded to a wheel body 16. Tire 10 comprises a carcass or casing 18 having an outer peripheral tread portion 20 in the crown 22 of the casing and sidewalls 24 extending from either side of the crown to beads 26 in the inside peripheral portions of the sidewalls. Treads 28 in any desired pattern can be incised in tread portion 20 of the casing 18. Beads 26, which can be reinforced with the usual annular cords or wires 30, are adapted to seat in an airtight relationship in the rim 14 when the tire is mounted on the wheel 12. The sidewalls 24 of the casing are reinforced by the usual known weftless radial plies or elements 32. Radial elements 32 can be fabricated out of steel wires or suitable textile fibers as is well known in the art. Located in the crown of the radial tire just described underlying the tread thereof is an annular compression element or band 36. Band 36 is reinforced and stabilized by the radial elements 32 in sidewalls 24 to give tire 10 its run-flat capabilities. When mounted on the wheel 12, tire 10 can be inflated through the usual valve (not shown) in the rim of the wheel.

Figure 4:
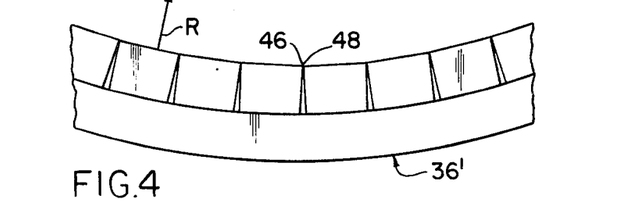

To provide a banded run-flat tire that has a very supple band for low-deflection pressurized operation and significantly increased stiffness as deflection is increased as in unpressurized and run-flat operation, the band 36 has dual-modulus of bending characteristics. As discussed previously herein, bands having three types of dual-modulus characteristics can be used in the tire of this invention. In the first type of dual-modulus band, it is designed so that it has a greater resistance to bending forces tending to decrease its local radius of curvature than to those tending to flatten it. A dual-modulus band $36^1$ of the first type is shown in FIGS. 2–4.

As perhaps best shown in FIG. 2, dual-modulus band $36^1$ has a radially outward, substantially solid annular body section 38 and a radially inward circumferential body section 40. Inward body section 40 is provided with a series of discontinuities such as transverse slots 42 which separate the inward body into a series of lands 44 around the inside circumference of annular body section $36^1$ with the slots 42 between them. With this design, if loads are imposed that will flatten the band, the flattening is resisted only by the resiliency possessed by body section 38 (FIG. 3). When loads are imposed that tend to decrease the radius R of the band, the deflection closes the slots 42 such that the edges 46, 48 of adjacent lands 44 come into contact with one another. Once slots 42 close, body section 40 becomes, in effect, a solid member and further deflection is resisted by the band as if it were a solid element (FIG. 4).

Figures 5, 6, 7, 10:
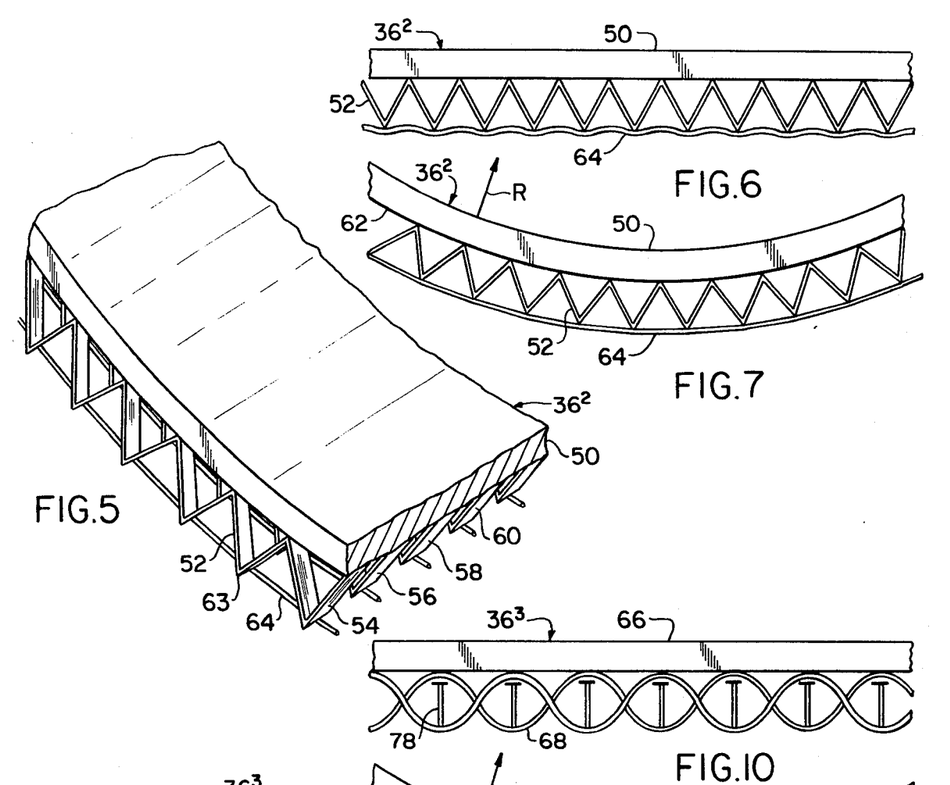
FIG. 5 is a fragmentary view in perspective of an embodiment of the dual-modulus band of the invention.
FIGS. 6 and 7 are fragmentary side elevations of the band of FIG. 5 under various operating conditions.
FIGS. 10 and 11 are fragmentary side elevations of the band of FIG. 8 under various operating conditions.
Figures 8, 9, 11:
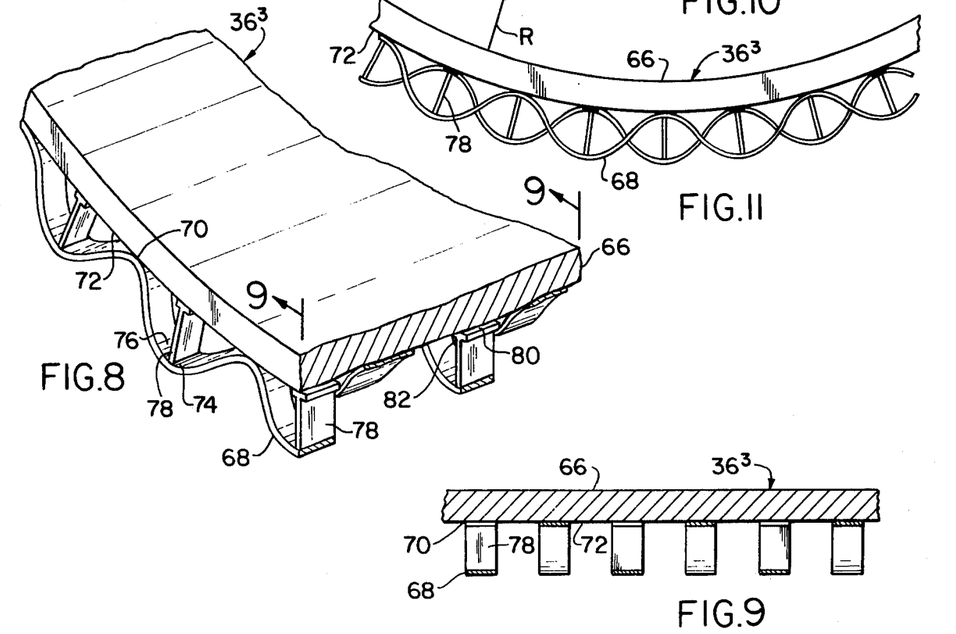
FIG. 8 is a fragmentary view in perspective of an embodiment of the dual-modulus band of the invention.
FIG. 9 is a cross-sectional view taken along line 9—9 of the band of FIG. 8.
Figure 12:
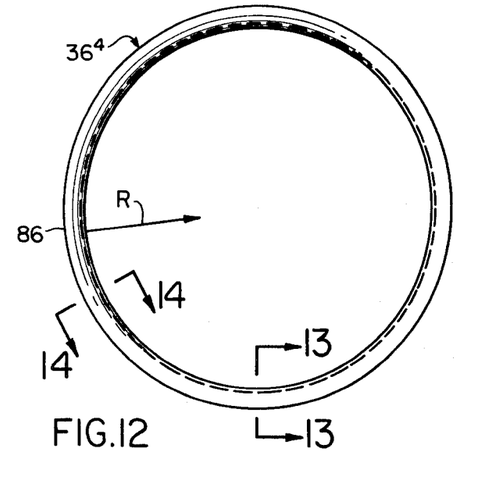
FIG. 12 is a side elevation in the unstressed condition of an embodiment of the dual-modulus band of the invention.

A further embodiment of a dual-modulus band is illustrated in FIGS. 5–7. As shown in FIG. 5, band $36^2$ has a thin annular band element 50 having a multiplicity of standoff shear ties, such as the V-shaped members 52, attached in discrete annular rows 54, 56, 58, and 60, for example, around the outer periphery 62 of the band element. The apexes 63 of the shear ties in each row are connected to one another by annular fibers 64. In operation, when loads are imposed on band $36^2$ in a direction tending to flatten it, the tension on the annular fibers 64 is relieved and the flattening is resisted only by the resiliency of the band element 50 itself (FIG. 6). When loads are imposed in the opposite direction tending to decrease the radius R of the band, the annular fibers 64 are put into tension and straighten out (FIG. 7). Further deflection of the band is resisted by the band and annular fibers in tension.

FIGS. 8-11 illustrate a further embodiment of the dual-modulus band of the invention. As perhaps best shown in FIG. 8, the band $36^3$ has a thin annular band element 66 having a number of transversely corrugated annular strips 68 attached side-by-side (FIG. 9) at the crests 70 of their corrugations to the band element 66 around the outer periphery 72 thereof. Attached to the inside surface 74 of each of the troughs 76 of the corrugated strips 68 is a radial strut 78. Each of the struts 78 can have a flange or buffer strip 80 on its radially inward free end 82. As in the previously described embodiments of the dual-modulus bands of the invention, when loads on the band $36^3$ are in a direction tending to flatten it, the deflection is resisted only by the natural resiliency of the band element 66 and the corrugated strips 68 (FIG. 10). When loads are imposed in the opposite direction tending to decrease the radius R of the band, the corrugations of strips 68 are subjected to forces tending to straigten them. This action causes the struts 78 to be moved radially inward until the flanges 80 on the strut free ends 82 come into contact with the outer periphery 72 of the band element 66 of band $36^3$. Thereafter, the band $36^3$ acts as a stiff beam resisting further decreases in its radius R.

Figures 13, 14:
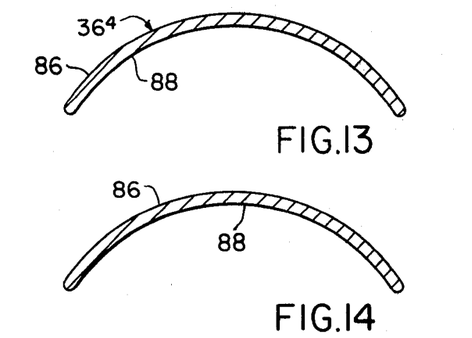
FIGS. 13 and 14 are cross-sectional views taken along lines 13—13 and 14—14 respectively of the band of FIG. 12.
Figures 15, 16, 17, 18, 19:
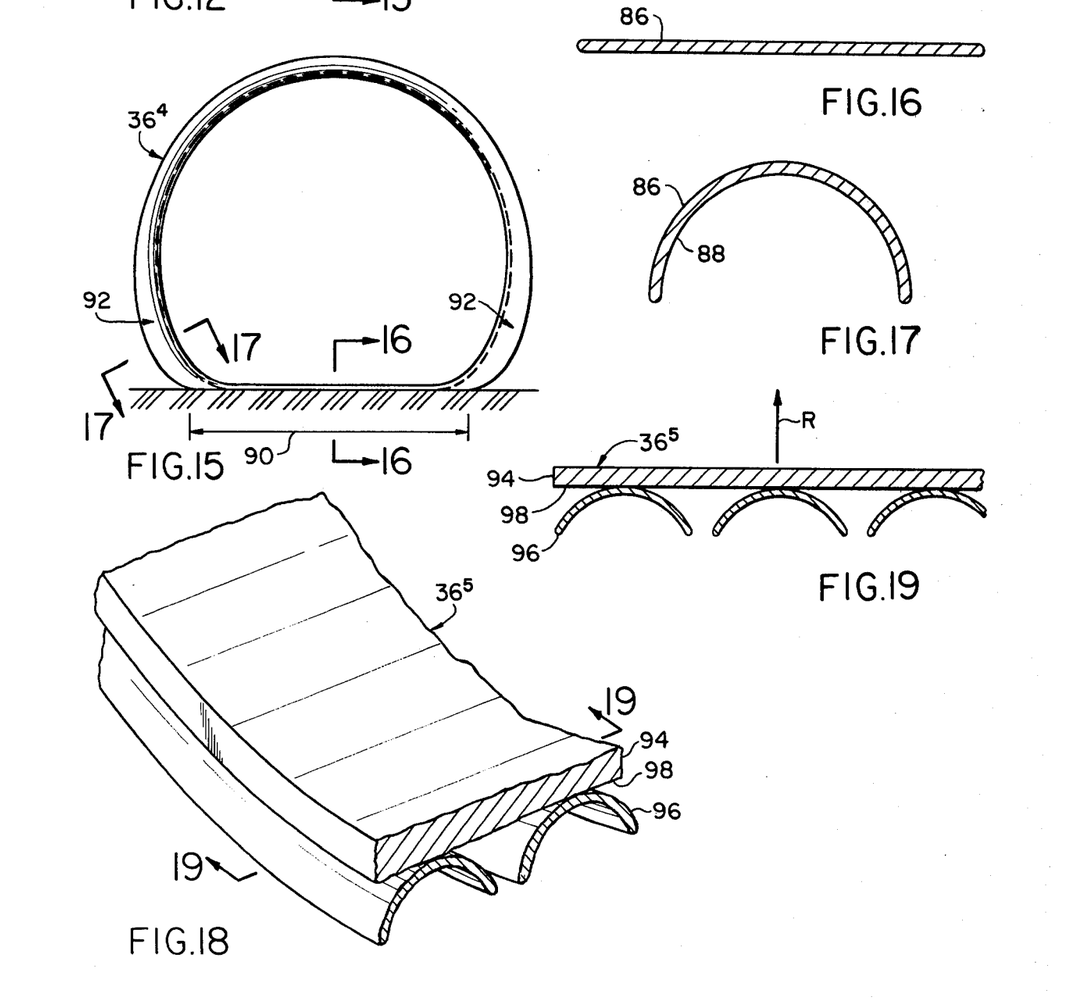
FIG. 15 is a side elevation in the stressed condition of the band of FIG. 12.
FIGS. 16 and 17 are cross-sectional views taken along lines 16—16 and 17—17 respectively of the band of FIG. 15.
FIG. 18 is a fragmentary view in perspective of an embodiment of the dual-modulus band of the invention.
FIG. 19 is a cross-sectional view taken along line 19—19 of the band of FIG. 18.

Another embodiment of the dual-modulus band of the invention is illustrated in FIGS. 12-17. As shown, the band $36^4$ has a band element 86 with an annular anticlastic shape; i.e., the structure has opposite curvatures at any given point. Thus, the band $36^4$ is an annular structure made from a sheet material and having, in the unstressed condition, an arcuate cross-section with concave surface 88 facing radially outward, as shown in FIGS. 13 and 14. With this configuration, when loads are imposed that tend to decrease the radius R of the band, as in the footprint area 90, for example, the band will deform such that its cross-section flattens out as indicated in FIGS. 15 and 16. Because a flat section has less resistance to deformation than a curved one, the sector of the band that is flattened will, therefore, have a lower section modulus. However, as indicated in FIGS. 15 and 17, there is an increase in the cross-sectional curvature of the band at the sectors 92 of the band on either side of the flattened sector. In the sectors 92, the band will thus have a greater section modulus.

An embodiment of the invention that is a variation of the preceding anticlastic type of band structure is illustrated in FIGS. 18 and 19. As shown, band $36^5$ comprises a band element 94 having a number of annular anticlastic elements 96 afixed side-by-side on the outside peripheral surface 98 of the band element. Each of the anticlastic elements 96 is made from a sheet material and, in the unstressed condition, has an arcuate cross-section with a concave surface facing radially outwardly. In operation, the behavior of anticlastic elements 96 will substantially correspond collectively to that of the single anticlastic element 86 of band $36^4$. Thus, it is believed that a further description thereof will serve no useful purpose and such will not be given.

Dual-modulus behavior in the band to provide greater resistance to bending forces tending to decrease its local radius of curvature than to those forces tending to flatten it is attainable by the use of materials whose elastic properties are different in tension and compression. In the fabrication of the annular band, the various materials used can be arranged in a predetermined sequence of coaxial layers or thicknesses. In selecting the materials used in the band, the material having a modulus lower in compression will be situated toward the outside diameter of the band. A candidate material for use in the outside region of the band is Kevlar (an aramid marketed by DuPont Company). The micro-structure of Kelvar would cause it to act in a low-modulus manner if, in the fabrication of the band, hoopwise fibers of Kelvar are embedded in a matrix having a low modulus. In this embodiment, the inside layers or thicknesses of the band can be fabricated out of glass fibers in an epoxy resin matrix.

Figure 20:
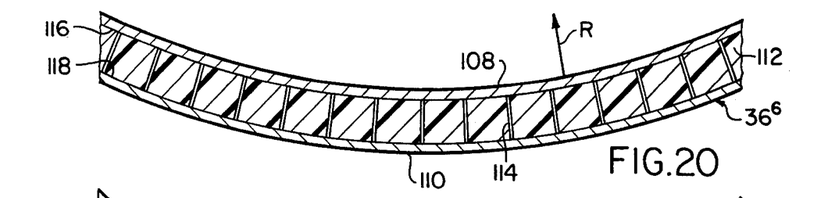
FIG. 20 is a fragmentary side view in section of an embodiment of the dual-modulus band of the invention in an unloaded condition.
Figure 21:
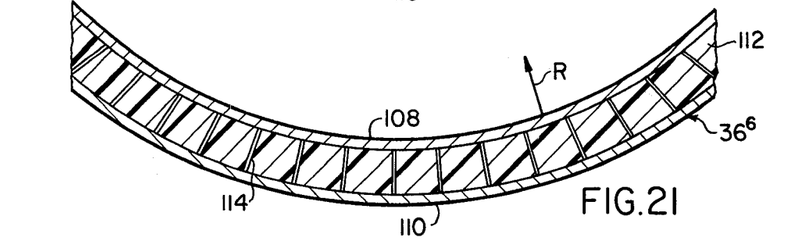
FIGS. 21 and 22 are fragmentary side views in section of the band of FIG. 20 under various operating conditions.
Figure 22:
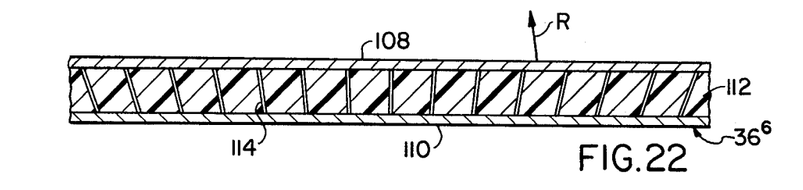

A second type of dual-modulus band behavior attainable in this invention is characterized by a bending stiffness which increases in either direction with increasing applied load. An embodiment of that type of band is illustrated in FIGS. 20-22. As shown, the dual-modulus band $36^6$ comprises a pair of thin annular elements 108 and 110 having an elastomeric filler material 112 sandwiched between them. As discussed previously herein, this arrangement forms a structure analogous to a beam with the elastomeric material acting as the web of the beam and the annular elements the caps of the beam. A multiplicity of discrete tensile fibers 114 connect the outside surface 116 of inner annular element 108 with the inside surface 118 of the outer annular element 110. It will be appreciated that the individual fibers are completely surrounded by the elastomeric filler 112. Preferably, also, the elastomer is one selected for its favorable properties in compression.

In operation in the unstressed condition, the annular band elements 108 and 110 have a circular shape and the fibers 114 will be oriented radially and thus will not impose any stresses on the elastomeric material 112 surrounding them (FIG. 20). Should a load be imposed that reduces the radius of curvature R of band $36^6$, the consequent differential movement of the outer annular element relative to the inner annular element puts the fibers into diagonal tension. This puts the elastomeric material into compression and the beam stiffness increases proportionately as the diagonal tension angle increases (FIG. 21). Should the load tend to flatten the band, the relative movement between the annular elements puts the fibers into diagonal tension in the opposite direction as shown in FIG. 22 to again put the elastomeric material into compression and the beam stiffness will again increase proportionally with band deflection.

Figures 23, 24, 25:
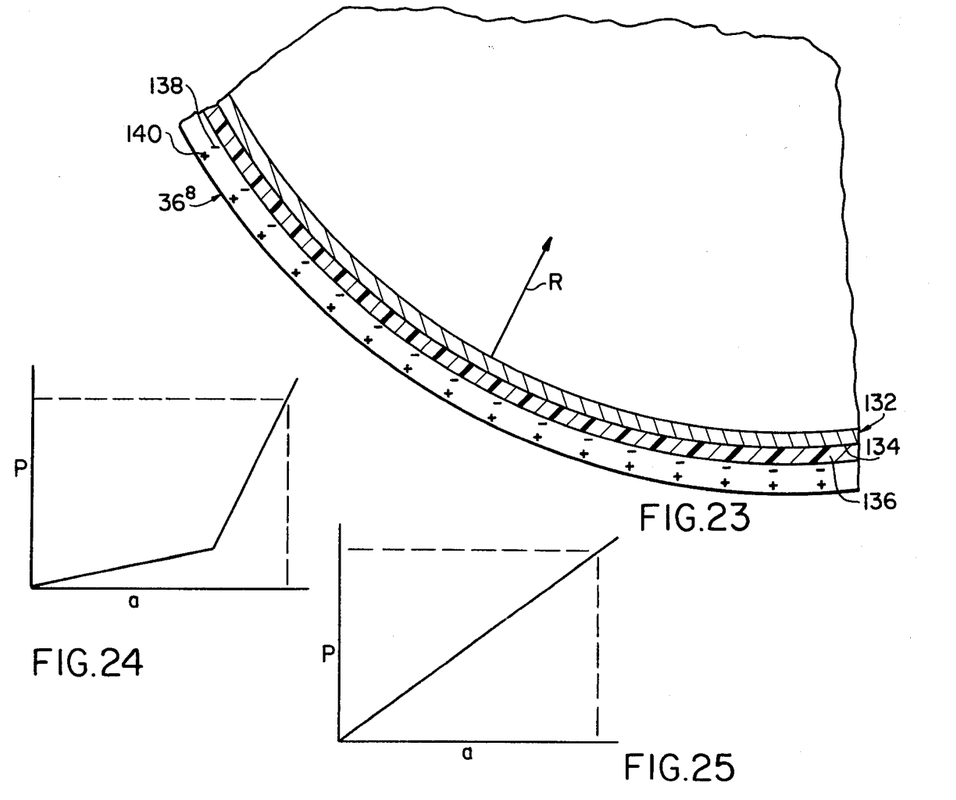
FIG. 23 is a fragmentary side view in section of a mandrel for fabricating the dual-modulus band of the invention showing a band thereon.
FIG. 24 is a plot of stress versus deflection of a two-step dual-modulus band of the invention being bent in one direction.
FIG. 25 is a plot of stress versus deflection of the band plotted in FIG. 24 being bent in a direction opposite that obtaining in the plot of FIG. 24.

A preferred embodiment of the dual-modulus band of the invention employs a filament wound structure. In this embodiment in the winding operation during the fabrication of the band, the inner filament layers of the band are put into compression by the outer layers. This compression of the inner layers can be achieved by winding the band on a cylindrical mandrel with a compressible outer surface. As indicated in FIG. 23, the cylindrical mandrel 132 has its outer diametrical surface 134 coated with an elastomeric material 136. During the filament winding process in winding band 36⁸, the accumulation of compressive forces induced by the winding process produces a slight reduction in mandrel diameter. This causes the earliest-wound filaments to deflect compressively, as indicated by the minus (−) signs 138, relative to the later-wound filaments, indicated by the plus (+) signs 140. This compression of the earliest-wound filaments is in both the circumferential and radial direction and is believed to induce a micro-wrinkling in those filaments. This micro-wrinkling is locked in when the resin matrix of the band is cured, reducing the low-stress bending modulus of the band.

Instead of employing an elastomer coated mandrel in the band winding operation, a progressive increase in winding tension using a conventional filament winding mandrel can be employed to produce a band having a dual-modulus behavior. In this technique, the first layers of filaments are wound on the mandrel with just enough tension to cause them to lie flat. In subsequent layers, the filament tension is increased controllably and in a reproducible manner either in one large step or in a programmed series of smaller steps. The final layers are wound with considerable tension and the ends are secured to maintain this tension and the resulting compression in the band is locked in during the curing phase of fabrication.

Conventional filament winding equipment is used in winding the filament wound bands of this invention. Fiberglas or E Glass filaments in a resin matrix with a nominal filament/resin ratio of about 60/40 are suitable for use. Resin formulations using, for example, about 0.5 lb of EPON 828, 0.4 lb of methyl nadic anhydride, 0.45 lb of flexiblizer AC-39, and 0.05 lb of benzyl di-methyl amine, have been used successfully. Other resin formulations suitable for use in one using about 4.5 lbs of EPON 828, 4.0 lbs of methyl nadic anhydride, 0.05 lb benzyl di-methyl amine, 0.25 lb of KELPOXY G 272-100, and 0.25 lb KELPOXY G 293-100; or another formulation using about 4.0 lbs EPON 828, 4.0 lbs methyl nadic anhydride, 0.05 lb benzyl di-methyl amine, 0.5 lb KELPOXY G 272-100, and 0.5 lb KELPOXY G 293-100. Any suitable known technique for integrating the filaments and the resin can be employed. As is well known in the art, curing of the resin can be carried out at any suitable temperature for any suitable time, as, for example; at 325 F. for 4 hr; or 325 F. for 4 hr and 400 F. for 4 hr; or at 325 F. for 4 hr plus the tire cure cycle.

It will be appreciated that, irrespective of the fabrication technique used to fabricate the filament-wound band of the invention, the critical element is the prestressing of the outer filament layers of the band. With a band so wound the band exhibits a two-step dual-modulus; when the composite band is bent in a direction which tends to straighten it, the band exhibits a low bending modulus at low stress levels and a distinctly higher modulus at stress levels above approximately 50% of failure stress. In tests that were made, when the band was bent in a direction which tended to straighten it; the initial stress modulus was $2 \times 10^6$ psi, the final stress modulus was $8 \times 10^6$ psi, producing a curve such as that in which stress (P) is plotted against deflection a (FIG. 24). Bending response in the opposite direction was conventional. In that direction, with deflection tending to decrease the radius of the band, the precompressed fibers stay in compression and the modulus was a straight line of $5 \times 10^6$ psi (FIG. 25).

Although embodiments of the dual-modulus bands of the invention illustrated in FIGS. 2-11, for example, are not shown incorporated in a tire, it will be understood that those bands will be built into the tire during the fabrication thereof. When built into the crown of the tire as shown in FIG. 1, the elements of those embodiments such as the shear ties and annular fibers and the annular corrugated strips and radial struts are embedded in the carcass material of the tire.

It will be recognized that it is feasible to tailor the dual-modulus response of the bands in various ways to attain a predetermined bending behavior. For example, in the FIGS. 5-7 embodiments, the annular fibers 64 that are normally straight in the unstressed condition of the band can be curved initially. At low stress and deflection levels in a direction away from the diametrical side on which the initially curved annular fibers are located, the band is not as stiff as it is later on when the annular fiber tensile elements become straight.

Although shown and described in what are believed to be the most practical and preferred embodiments, it is apparent that departures from the specific methods and designs described and shown will suggest themselves to those skilled in the art and may be made without departing from the spirit and scope of the invenion. We, therefore, do not wish to restrict ourselves to the particular constructions described and illustrated, but desired to avail ourselves of all modifications that may fall within the scope of the appended claims.

Having thus described our invention, what is claimed is:

1. In a banded radial run-flat tire having a resilient annular band in the crown region of said tire, said band being reinforced and stabilized by a multiplicity of radial elements in the tire sidewalls so that said band acts as a compression element to support said tire in the run-flat condition, an improved dual modulus of bending band having a low bending modulus at low stress levels of the band due to low radial deflection associated with operation at normal tire inflation pressures and a distinctly higher modulus at higher stress levels associated with increased radial deflection due to decreases in tire inflation pressures, wherein said resilient annular band includes at least an annular region thereof containing means for resisting compression loads such that resistance to radial deflection tending to decrease the local radius of curvature of said band is greater than the resistance to radial deflection tending to flatten said band, whereby said resilient annular band exhibits increased bending stiffness circumferentially with increases in deflection such that resistance to radial deflection tending to decrease the local radius of curvature of said band has non-linear characteristics and is greater than the resistance to radial deflection tending to flatten said band in the area of ground contact of the tire.

2. The tire defined in claim 1 wherein the bending modulus of said band increases at one rate under initial applied stress and at a second increased rate under continued applied stress.

3. The tire defined in claim 1 wherein the annular region of the resilient annular band has a radially inward annular region and a radially outward region and wherein said radially inward region has means resisting compression loads such that resistance to deflection tending to decrease the local radius of curvature of said band is greater than the resistance to deflection tending to flatten said band.

4. The tire defined in claim 3 wherein the radially inward annular region is characterized by discontinuities in the inside peripheral surface thereof.

5. The tire defined in claim 4 wherein the radially inward annular region comprises a diametrical series of lands separated by transverse slots running axially across the band such that, when the band is deflected in a direction reducing its local radius of curvature, the slots close up bringing the sides of adjacent lands into contact with one nother so that further deflection is resisted by the inward and outward band regions in unison and wherein band deflection in a direction tending to flatten it causes a separation of adjacent lands such that further deflection in that direction is resisted only by said outward region.

6. The tire defined in claim 1 wherein the annular region of the resilient annular band has a radially inward annular region and a radially outward region and wherein said radially outward region has means resisting tension loads such that resistance to deflection tending to decrease the local radius of curvature of said band is greater than the resistance to deflection tending to flatten said band.

7. The tire defined in claim 6 wherein the radially inward region of the band is an annular hoop-like element and the radially outward region is an arrangement of multiple annular rows of radially outwardly projecting stand-offs fixed on the outer diametrical surface of said annular element, annular fibers connecting the distal ends of said sand-offs in each of said rows, said annular fibers going into tension to resist band deflection in a direction reducing its local radius of curvature and going slack such that they are inactive with respect to deflection in a direction flattening said band.

8. The tire defined in claim 7 wherein the annular fibers are initially slack in the normal unstressed condition of the band such that a two-step bending modulus results when the band is deflected in a direction reducing its local radius of curvature.

9. The tire defined in claim 6 wherein the radially inward region of the band is an annular hoop-like element and the radially outward region is an arrangement of multiple annular rows of axially corrugated strips fastened at the crests of the strip corrugations on the outer diametrical surface of said annular element, radially inwardly projecting struts fastened in each groove of said corrugated strips, whereby a straightening of said corrugated strips brought about by deflection of the band in a direction reducing its local radius of curvature brings the distal ends of said struts into contact with the outer surface of said annular element such that a further deflection of said band in the same said direction is resisted by the combined response of said annular element and said strip arrangement.

10. The tire defined in claim 9 wherein there is a gap between the distal ends of the radial struts and the outer diametrical surface of the annular band element in the normal unstressed condition of the band such that a two-step bending modulus results when said band is deflected in a direction reducing its local radius of curvature.

11. The tire defined in claim 1 wherein the annular region of the resilient annular band is formed of sheet material in an annular anticlastic shape having an arcuate cross-section with its concave surface facing radially outward, the arcuate shape flattening under load at the footprint of said tire to lessen the resistance to bending in that area and depending on both sides of the footprint to stiffen resistance to bending in those areas.

12. The tire defined in claim 6 wherein the radially inward region of the band is an annular hoop-like element and the radially outward region is an arrangement of multiple annular rows of anticlastic annuli each annulus having an arcuate cross-section with its concave surface facing radially outward.

13. The tire defined in claim 1 wherein the annular region of the resilient annular band comprises inner and outer hoop-like coaxial elements, radial fibers connecting the radially outside surface of said inner coaxial element with the radially inside surface of said outer coaxial element, an elastomeric filler material filling the annular space between said coaxial elements such that said radial fibers are embedded therein, whereby relative displacement between said coaxial elements due to deflection of said band places said radial fibers into diagonal tension to place said filler material into compression to thereby vary the bending stiffness of said band.

14. The tire defined in claim 1 wherein the annular region of the resilient band comprises a radially inner layer and a radilly outer layer, said radially inner layer having been put into compression by said outer layer such that said band has a low bending modulus at low stress levels tending to flatten it and a relatively higher bending modulus at high stress levels whereby a very supple band for low-deflection pressurized operation of said tire and a relatively stiff band for unpressurized operation of said tire is produced.

15. The tire defined in claim 14 wherein the band is fabricated out of a composite material.

16. The tire defined in claim 15 wherein the band is a filament wound structure having a resin matrix and wherein the radially inner layer of said band is wound with a relatively low tension and the radially outer layer of the band is wound with a relatively increased tension such that said inner layer is compressed by said outer layer.

17. The tire defined in claim 1 wherein the annular region of the resilient annular band comprises a radially inner layer and a radially outer layer fabricated out of materials whose elastic properties differ, said inner layer having a relatively higher modulus in compression than said outer layer.

18. The tire defined in claim 17 wherein the radially inner layer is fabricated out of glass fibers in a relatively high modulus of compression resin matrix and the radially outer layer is fabricated out of annularly oriented aramid fibers in a relatively low modulus of compression resin matrix.

* * * * *